United States Patent [19]

Habib

[11] 4,120,208

[45] Oct. 17, 1978

[54] CONTROL STEPPING DEVICE

[76] Inventor: Robert Habib, 36 Quai Gustave Ador, 1207 Geneva, Switzerland

[21] Appl. No.: 740,070

[22] Filed: Nov. 8, 1976

Related U.S. Application Data

[63] Continuation-in-part of Ser. No. 586,620, Jun. 13, 1975, abandoned.

[51] Int. Cl.² .............................................. F16H 27/02
[52] U.S. Cl. ....................................................... 74/128
[58] Field of Search .............. 74/126, 128, 129, 141.5, 74/142, 813, 817

[56] References Cited

U.S. PATENT DOCUMENTS

| | | | |
|---|---|---|---|
| 2,556,402 | 6/1951 | Small | 74/129 |
| 3,101,013 | 8/1963 | Ayers et al. | 74/128 |
| 3,504,206 | 3/1970 | Fritsch | 74/126 |
| 3,969,945 | 7/1976 | Englund | 74/128 |
| 3,977,263 | 8/1976 | Nara | 74/129 |

*Primary Examiner*—Benjamin W. Wyche
*Assistant Examiner*—Wesley S. Ratliff, Jr.
*Attorney, Agent, or Firm*—Robert E. Burns; Emmanuel J. Lobato; Bruce L. Adams

[57] ABSTRACT

A workpiece carrier comprises a circular plate formed with teeth and interchangeably mounted for rotation by an arm longitudinally movable parallel to the plane of the plate. The arm can also rotate about the center of the plate. The arm has at least one pin adjustably fixed relative to the arm and arranged to cooperate alternately with one of the sides of opposite teeth, which side is oblique with respect to the trajectory of the arm. Longitudinal movement of the arm in either direction is effected by hydraulic means, connected with the arm through passage means suitably permitting the rotating of the arm. The longitudinal movement causes the plate to pivot by one step. At the end of the longitudinal travel of the arm, in either direction, the pin is located in the base of the gap between two teeth.

11 Claims, 6 Drawing Figures

CONTROL STEPPING DEVICE

CROSS-REFERENCE

This is a continuation-in-part of the application, Ser. No. 586,620 filed June 13, 1975 now abandoned.

BACKGROUND OF THE INVENTION

The present invention relates to an indexing or stepping device or control for machines, comprising a circular plate provided with teeth and an arm longitudinally reciprocable parallel to the plane of the plate for rotating the plate through a predetermined angle.

Such a device, called indexing mechanism, is disclosed in U.S. Pat. No. 3,186,246. That device comprises a toothed plate and an arm longitudinally reciprocable parallel to the plane of the plate, to effect advancing rotary movements of the plate by forward and return movements of the arm. Driving and locking of the toothed plate in the prior device requires two pivoting pins mounted on springs, which makes the device complicated and delicate. Furthermore, it is impossible to interchange the toothed plate with other plates, whose teeth have a different pitch; the device is thus not a "universal" control or stepping device.

It is an object of the present invention to provide a universal control or stepping device. It is another object to provide such a device, using a toothed plate and a reciprocable arm, without special locking means, and to arrange it so that a movement of the arm in either direction ensures an advancing movement of the plate.

By way of example, the stepping device can be used, as is well known, to ensure exact angular positioning of a workpiece to be machined, or of a tool to be machined or ground, on which it is desired to carry out a succession of generally identical operations.

SUMMARY OF THE INVENTION

According to the present invention, there is provided a stepping device or control for a machine, the device comprising an interchangeably rotationally mounted circular plate provided with teeth, and an arm longitudinally reciprocable parallel to the plane of the plate for rotating the plate through a predetermined angle. The arm has at least one pin fixed relative thereto and arranged to cooperate alternately with corresponding sides of successive teeth, which sides are oblique with respect to the path of the arm, so that the movement of the arm in either direction causes the plate to pivot by one step and that at the end of travel of the arm, in either direction, the pin is located in the base of the gap between two teeth, means being provided for bringing the same side of another tooth into the path of the pin.

In the case of a very small number of steps, for example four or less, driving by the pins alone may cause certain difficulties. In this case, in order to remedy the latter, provision is made to ensure an initial drive of the plate by means of a friction member, a swinging movement of the plate being prevented by a brake or unidirectional clutch.

The device according to the invention makes it possible to combine in a single system, the conventional rotation and locking systems, since in this system the pin (or each pin) fulfils the function of a plate rotating member and also those of a locking member. In addition, in the case of an automatic movement of the arm, it is possible to use this arm directly for controlling other functions of the machine.

BRIEF DESCRIPTION OF THE DRAWINGS

Embodiments of the present invention will now be described, by way of example, with reference to the accompanying drawings, in which.

DESCRIPTION OF THE PREFERRED EMBODIMENT

Figure 5:
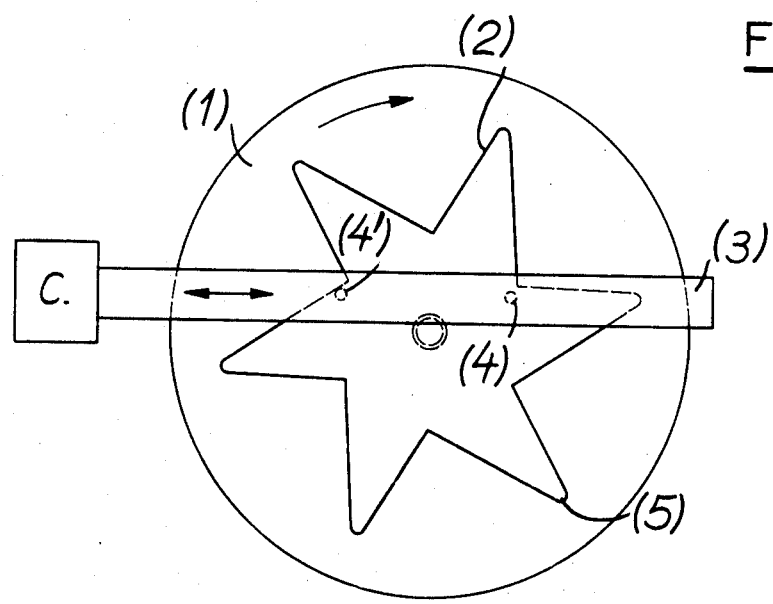
FIG. 5 is a diagram of the device.

Referring first to the diagram of FIG. 5, a wheel or plate 1 is shown, which is interchangeable depending on the desired number of steps, and which is provided with internal toothing, six teeth 2 being shown.

An elongate arm 3 is reciprocable longitudinally of its elongation along a path parallel to the plane of the plate 1, and is arranged near this plate, as shown. The arm has two laterally projecting pins 4,4' provided to cooperate alternately with corresponding sides of the teeth, which sides are oblique with respect to the path of the arm. When the arm moves towards the left (as seen in FIG. 5), it is the pin 4 shown at the left, which cooperates with the oblique side of a tooth in order to rotate the plate by one step, until this pin reaches base 5 of the gap between two teeth. The toothing is formed so that thereupon, the corresponding oblique side of another tooth is located on the reverse trajectory of the other pin, so that during the return movement of the arm, the other pin cooperates with the corresponding side of the other tooth, and causes the plate to move forwards by a step in the same rotary direction.

If the reciprocating movement of the arm is stopped in the end-of-travel position in either direction, one of the pins is located in the base of the gap between two teeth to lock the plate against rotation.

Figure 6:
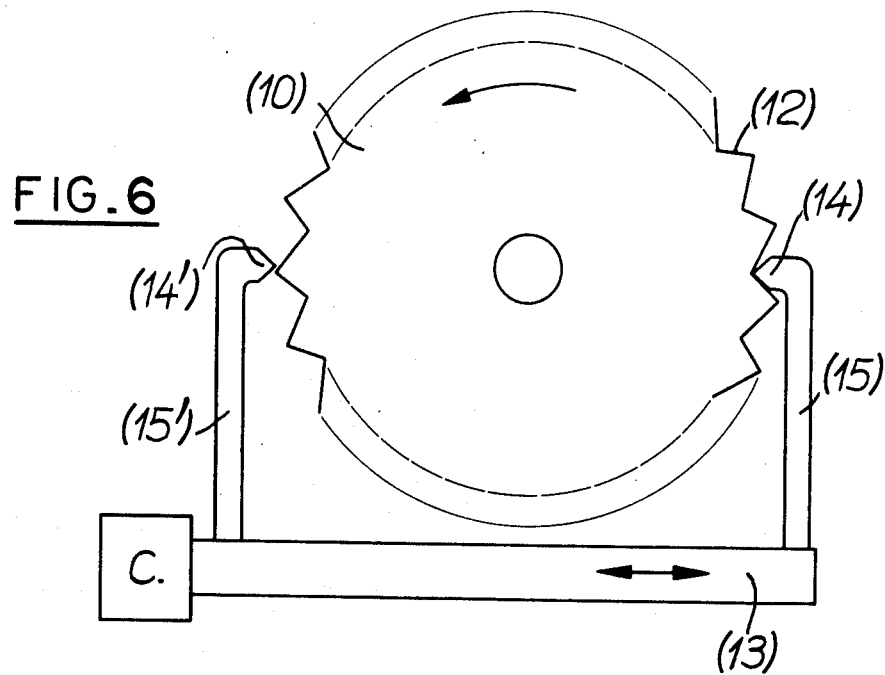
FIG. 6 is a modified diagram.

In order to reduce the bulk of the device, the arm 3 may be disposed approximately diametrically across the plate, with the pins arranged directly on the arm (FIG. 5) or spaced from the plate in the plane of the plate, with the pins located on two additional arms 15,15' which extend at right-angles to the main arm 13 and are mounted on the latter (FIG. 6).

In the case of a plate having a small number of teeth, for example four teeth, it is sometimes advantageous to provide a plate having internal toothing (FIG. 6), but in other respects, and mainly in the case of a plate having a substantial or high number of teeth, it is preferable to have a plate 10 having peripheral toothing (FIG. 5); with equal dimensions of the plate, the number of teeth will be greater, and these teeth will be easier to cut.

The arm 3 may be provided with a single pin which cooperates alternately on its two sides with the oblique sides of opposite teeth 2.

It is not always necessary that the pins are aligned on their path. In certain cases it may be advantageous to use more than two pins.

Reference will now be made to the preferred embodiment, shown by FIGS. 1 to 4, which in many respects resembles the diagram of FIG. 5.

Here the stepping device is mounted on a spindle support 1 of a grinding machine, having a spindle 2 one end area of which is shown and defines a stepping area; the other end, not shown, serving to hold a tool to be ground, for example a reamer or other cutter. The spindle support 1 is mounted pivotably about a vertical axis on a base 3.

The stepping device consists essentially of a single toothed wheel or plate 4, freely rotatable on spindle 2 in the stepping area but rotatably unitary with a clamp 5 which can be made rotatably unitary with an arm 8 transversely displaceable in the stepping area in a back and forth movement. In the illustrated embodiment the toothed wheel 4 presents six teeth, four of them being visible in FIG. 1 and being identified as 41, 42, 43 and 44. Clamp 5 has a radial slot 9 extending to spindle 2 and permitting its clamping on spindle 2 by means of a bolt 10 bearing on an arm 51 of clamp 5 and bolted in an arm 52 thereof. At a location diametrically opposite slot 9 the clamp 5 has an arm 53 of substantially rectangular form, pierced by an oblong aperture 11 of substantially rectangular form extending perpendicularly to a radius passing through the axis of spindle 2. Into the ends of aperture 11 extend the ends of two screws 12 and 13, which are threaded in the material of clamp 5 at the ends of the aperture 11, and extend in the same direction as this aperture. A finger 14 is threaded into toothed wheel 4 (FIG. 2), extends parallel to the axis of spindle 2, and is engaged in the oblong aperture 11 between the ends of screws 12 and 13; this finger 14 accordingly effects rotational unity of toothed wheel 4 and clamp 5.

Each tooth of the toothed wheel 4 presents a short straight face, such as for example 42a, and a curved face such as 42b followed by a straight portion such as 42c. Face 42a is a disengagement face which is not utilized for the pushing of the toothed wheel, whereas faces 42b and 42c are push-receiving faces on which the actuating fingers 6 and 7 act, as will be described below.

Figure 2:
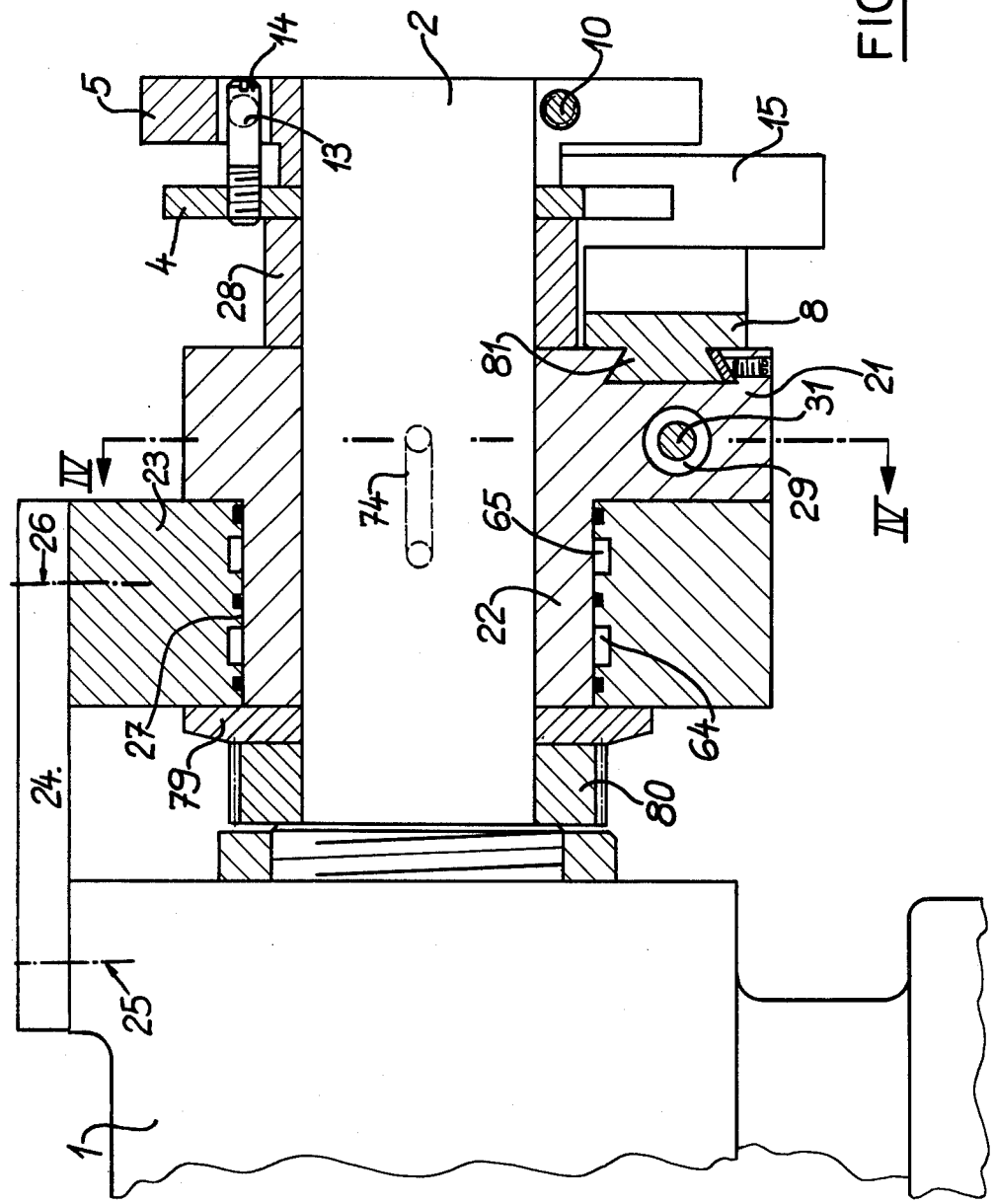
FIG. 2 is a sectional view taken along lines II—II in FIG. 1.

The actuating fingers 6 and 7 are mounted on vertical arms 15 and 16 fixed to the body of arm 8 by screws 17 and 18; the arms 15 and 16 presenting slots 19 and 20, respectively, which permit setting the height of fingers 6 and 7 relative to arm 8. The vertically settable arms 15 and 16 are fork-shaped, the fingers 6 and 7 being fixed between the two branches of these forks so as to provide firm mounting of the fingers 6 and 7 (FIGS. 2 and 3).

Arm 8 constitutes a slide-block and presents for this purpose a dovetail portion 81 (FIG. 2) which can slide in a groove of corresponding profile, machined into an arm support 21. This support is freely rotatably mounted on spindle 2 and is extended by a cylindrical hub 22, engaged in the bore 27 of a frame 23 which is fixed to the body of spindle support 1 by means of a plate 24, bolted to the spindle support 1 at 25 and to the frame 23 at 26. The toothed wheel 4 is held with axial thrust against a spacer provided by sleeve 28.

Machined into the arm support block 21 is a cylinder 29 (FIGS. 2 and 4) which serves as the cylinder of a hydraulic double-acting jack, having a piston 30 mounted on a piston rod 31. Piston 30 has an O-ring seal section 32. Each end of cylinder 29 is closed by a cap 33,34 welded to arm support 21 and having fluid-tight packing 35,36.

Figure 3:
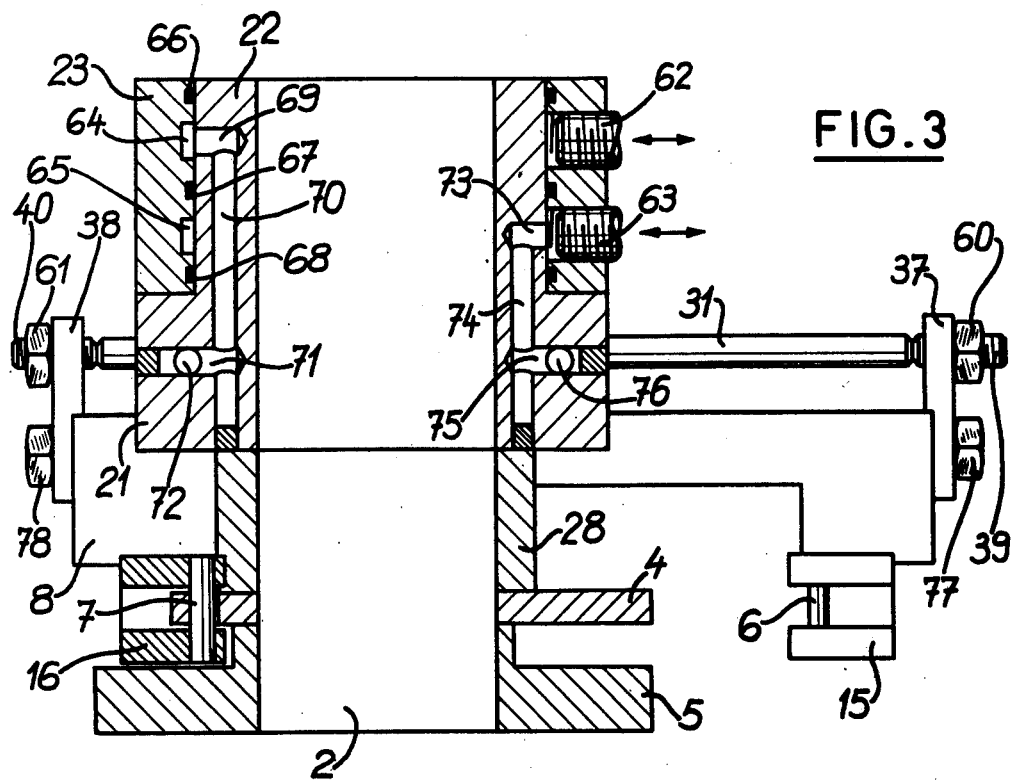
FIG. 3 is a sectional view taken along lines III—III in FIG. 1.
Figure 4:
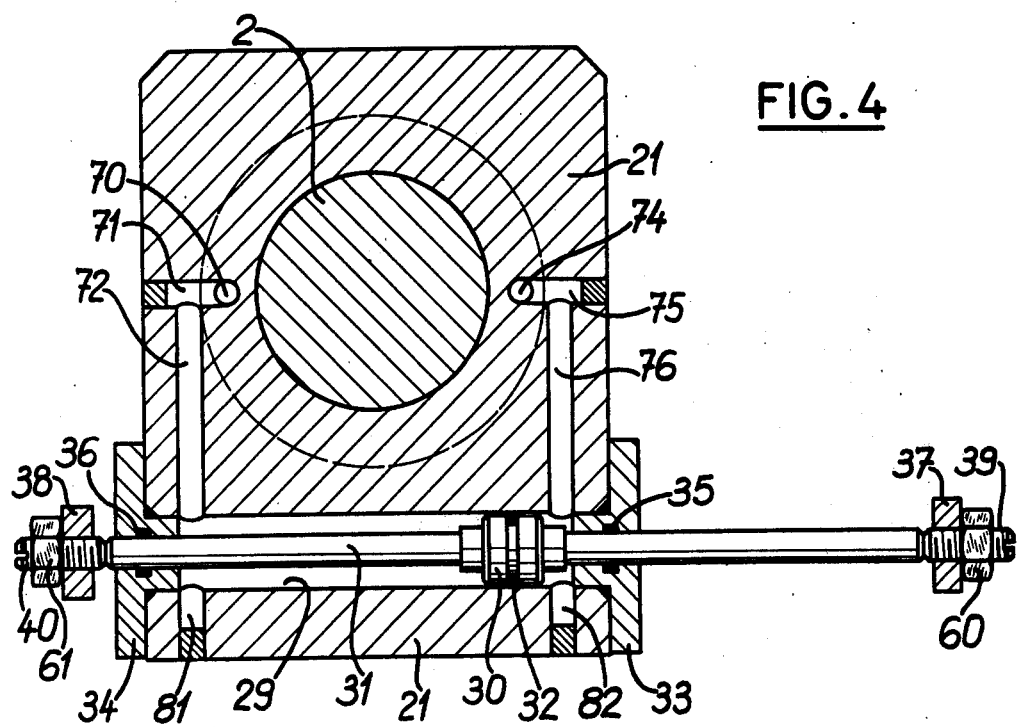
FIG. 4 is a sectional view taken along lines IV—IV in FIG. 2.

Referring to FIGS. 3 and 4, arm 8 has two horizontal limbs 37 and 38, fixed to the ends of arm 8 by two screws 77 and 78, and on which there are threaded two abutment screws 39 and 40, respectively, secured by nuts 60 and 61. These abutment screws 39 and 40 are in contact with the ends of piston rod 31, so that arm 8 is united, for displacement, with piston 30. The settable abutment screws permit setting the position of fingers 6 and 7 of the displacement arm 8 relative the position of piston 30 at the end of each stroke.

As the arm support 21 must be rotated in certain cases, the feeding of the double-acting jack is carried out by means of frame 23. This frame carries two screw fittings 62 and 63, connected by tubes, not shown, with a four-way valve, not shown. The fittings 62,63 end in two circular channels 64,65, formed by grooves machined into frame 23 and by the outer surface of hub 22 of arm support 21. Seals 66,67 and 68 assure fluid-tight separation. Channel 64 communicates with a cylindrical radial passage 69 machined into hub 22, which in turn communicates with a cylindrical means 70 parallel to the axis of the spindle and communicating by an elbow 71 with a continuing passage 72 that ends in cylinder at left of piston 30. Circular channel 65 similarly communicates with the right side of piston 30 by passages 73,47,76 and 77.

Hub 22 is furthermore, united with an axial retainer ring 79 and with a dented wheel 80 mounted for free rotation on spindle 2. Dented wheel 80 and ring 79 are fixed to hub 22, in directions parallel to the axis, by screws, not shown. The dented wheel 80 meshes with a dented belt, not shown, which is connected with a device for helical motion of the grinding spindle of a cylindrical reamer or other cutter with helicoidal teeth, as described for example in U.S. Pat. No. 3,851,563 of Robert HABIB, entitled MACHINE TOOL.

On removal of clamp 5 one can slip a stepping wheel 4 onto spindle 2. Then one mounts the clamp on element 2 again, causing finger 14 to enter aperture 11. The screws 12 and 13 are turned home, with finger 14 approximately in the middle of aperture 11. One then positions the stepping wheel with respect to the position of one of fingers 6,7 —preferably finger 7—, acting as stopping finger. For this purpose one fixes element 5 on spindle 2 by bolting down the bolt 10. The displacement fingers 6 and 7 are suitably placed in elevation, so that they can work correctly on the tooth flanges, such as 42b and 42c, of the inserted wheel or plate 4. With arm 8 in the position of FIG. 1, one makes sure that finger 7 can be disengaged from the bottom of the tooth, by displacement toward the left, without displacement of the stepping wheel 4. When the elements of the stepping device are fixed in the position shown in FIG. 1, the device is ready to operate. The screws 12,13 of clamp 5 serve to angularly set, not the stepping device itself but the grinding tool, relative to a grinding mill.

Figure 1:
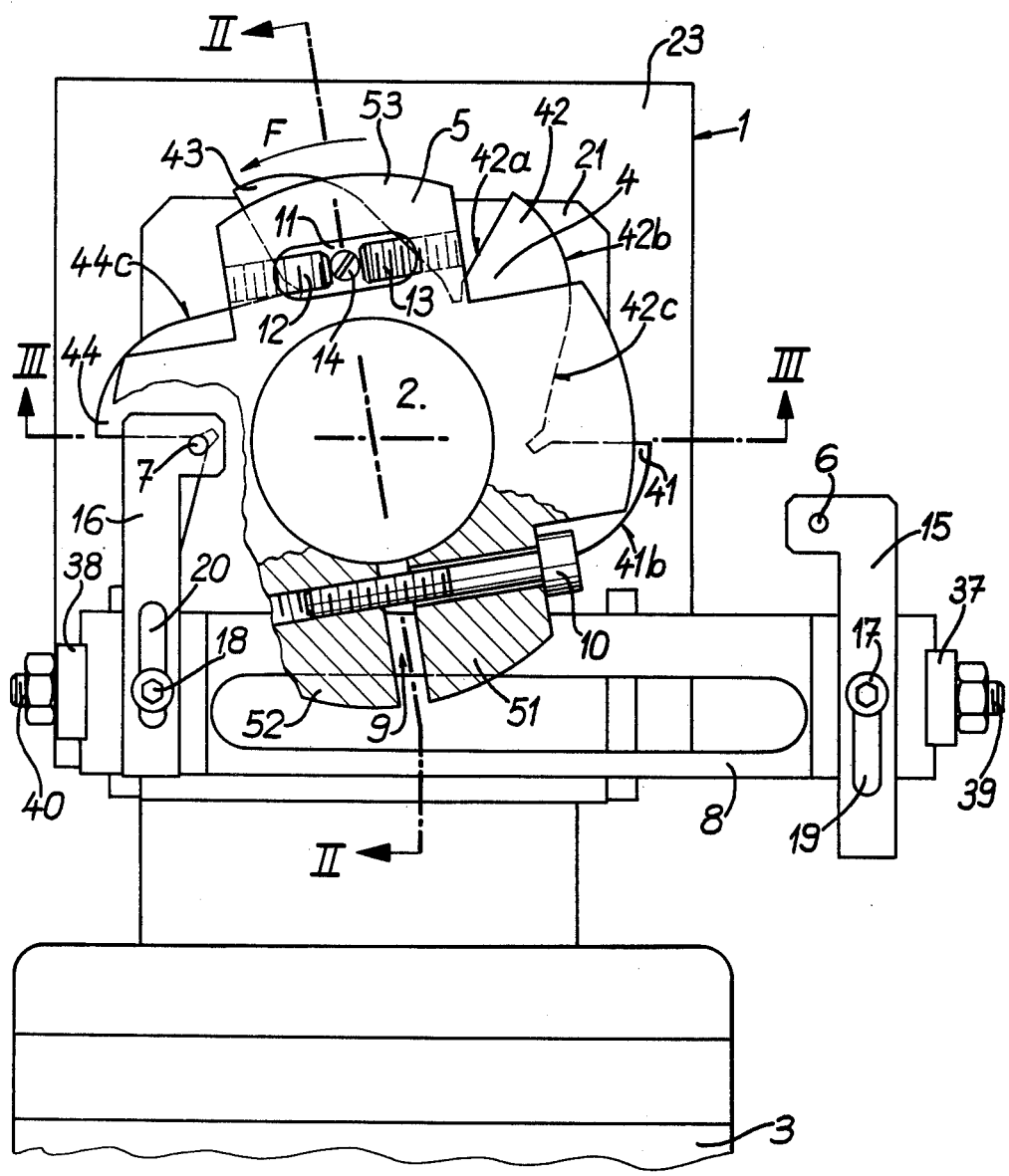
FIG. 1 is a front elevation of the device, partly broken away.

Advancing the stepping device by one step, that is, by one tooth, is achieved by a complete back and forth movement of arm 8, starting from the position shown in FIG. 1. Arm 8 is first displaced from right to left, and finger 6, in its trajectory encounters curved face 41b of tooth 41. When arm 8 reaches the end of the stroke, finger 6 is at the bottom of the notch between two successive teeth. During this stroke stepping wheel 4 turns counterclockwise, as shown by arrow F, approximately by the space of a half step. (The arm and jack support 21 is prevented from turning, by the helicoidal drive means which immobilizes the dented wheel 80, and thereby the support 21. This retaining action is aided by the substantial friction of seals 66,67,68 on hub 22). At the same time the finger 7 is disengaged from the path of the teeth of wheel 4.

Thereafter, arm 8 is displaced from left to right. Finger 6 then leaves the path of the teeth of wheel 4, whereas finger 7 then encounters the straight portion 44c of the working surface 44b, 44c of tooth 44, and pushes this tooth to turn stepping wheel 4 in direction F during the remainder of the step. At the end, finger 7 is again in the position shown in FIG. 1, and stops the wheel 4, with tooth 43 occupying the position shown for tooth 44.

On rotation of dented wheel 80 by the helicoidal drive device, the spindle is rotated by means of arm support 21, united with the dented wheel 80, and of finger 7 of arm 8. Oil pressure is maintained in the jack, while the arm support 21 can move to an angular position different from the position shown in the drawing. For this purpose the oil feeding means and passages illustrated in the drawing are needed. It will be understood that the feeding of the jack can be simplified if it is not necessary to turn the spindle between its steps; elements 21,23 can then be replaced by a unitary, stationary element, and the jack can be fed for example by channels 81,82 (FIG. 4).

The use of a back and forth movement of arm 8 to advance the stepping device by one step is not indispensable, but it allows simplification of the shaping of the teeth, when the number of teeth is small; it allows working, without difficulty, with a wheel of only four teeth. When more teeth are used it is possible, without difficulty, to advance the stepping device by one step during each movement of arm 8; the one to the left and the one to the right. In this case each finger, by itself, provides the complete advance by one step, and the stopping.

What is claimed is:

1. Stepping device, comprising;
    a support having means defining a stepping area;
    a single plate of circular outline, the plate having a number of teeth distributed over a circumferential area thereon with a gap between every two teeth, each tooth having a side oblique to a diameter of the plate;
    means for mounting the plate in the stepping area, interchangeably with generally similar plates having different numbers of teeth, for rotation about the center of the circular outline; and
    an elongate arm mounted for longitudinal forward and backward movements in the stepping area, parallel to a diameter of the plate, and having means for effecting such movements, the arm having finger means thereon for forwardly and backwardly moving therewith along a path generally diametrical of the plate and disposed relative to the teeth to effect intersecting of oblique sides of successive ones of the teeth with said path for (a) thereby engaging successive ones of the oblique sides to effect successive steps of the rotation of the plate and (b) temporarily locking the plate against the rotation thereof, at the end of each movement of the arm, by then locating the finger means in a base portion of a gap between the tooth the oblique side of which was engaged during the movement and a next following one of the teeth.

2. Stepping device according to claim 1, in which the finger means on the arm are disposed relative to the teeth to effect the intersecting alternately on mutually opposite teeth.

3. Stepping device according to claim 2, in which the finger means comprise a first finger and a second finger spaced from the first one longitudinally of the arm, for effecting alternately contacting the first and the second finger with the mutually opposite teeth for the alternate intersecting thereof.

4. Stepping device according to claim 1 in which the means for effecting the movements of the arm comprises a fluid-operated jack.

5. Stepping device according to claim 1 in which the number of teeth is at least four.

6. Stepping device according to claim 1 wherein each tooth has a second side, approximately radial of the plate.

7. Stepping device according to claim 1, in which said circumferential area of the plate of circular outline is disposed externally of the teeth.

8. Stepping device according to claim 1, in which said circumferential area of the plate of circular outline is disposed internally of the teeth.

9. Stepping device according to claim 1 in which the finger means are rigid with the arm.

10. Stepping device, comprising;
    a plate of circular outline, the plate having a number of teeth distributed over a circumferential area thereon with a gap between every two teeth, each tooth having a side oblique to a diameter of the plate;
    means for mounting the plate, interchangeably with generally similar plates having different numbers of teeth, for rotation about the center of the circular outline; and
    an elongate arm mounted for longitudinal forward and backward movements, parallel to a diameter of the plate, and having means for effecting such movements, the arm having finger means adjustably mounted thereon to match the different numbers of teeth of the interchangeably mounted plates, for forward and backward moving of the finger means with the arm along a path generally diametrical of the plate and disposed relative to the teeth to effect intersecting of oblique sides of successive ones of the teeth with said path for (a) thereby engaging successive ones of the oblique sides to effect successive steps of the rotation of the plate and (b) temporarily locking the plate against the rotation thereof, at the end of each movement of the arm, by then locating the finger means in a base portion of a gap between the tooth the oblique side of which was engaged during the movement and a next following one of the teeth.

11. Stepping device, comprising;
    a plate of circular outline, the plate having a number of teeth distributed over a circumferential area thereon with a gap between every two teeth, each tooth having a side oblique to a diameter of the plate;
    means for mounting the plate, interchangeably with generally similar plates having different numbers of teeth, for rotation about the center of the circular outline; and
    an elongate arm mounted for longitudinal forward and backward movements, parallel to a diameter of the plate, and having means for effecting such movements, the arm having means for mounting it adjustably with respect to the means for effecting movements thereof to match the different numbers of teeth of the interchangeably mounted plates, and the arm having finger means thereon for forwardly and backwardly moving therewith along a path generally diametrical of the plate and disposed relative to the teeth to effect intersecting of oblique sides of successive ones of the teeth with said path for (a) thereby engaging successive ones of the oblique sides to effect successive steps of the rotation of the plate and (b) temporarily locking the plate against the rotation thereof, at the end of each movement of the arm, by then locating the finger means in a base portion of a gap between the tooth the oblique side of which was engaged during the movement and a next following one of the teeth.

* * * * *